(12) United States Patent
Cheah et al.

(10) Patent No.: US 7,965,278 B2
(45) Date of Patent: Jun. 21, 2011

(54) OPTICAL NAVIGATION DEVICE ADAPTED FOR NAVIGATION ON A TRANSPARENT PLATE

(75) Inventors: Chiang Sun Cheah, Penang (MY); Chin Heong Yeoh, Penang (MY); Chiang Mei Teo, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 912 days.

(21) Appl. No.: 11/618,427

(22) Filed: Dec. 29, 2006

(65) Prior Publication Data

US 2008/0158158 A1 Jul. 3, 2008

(51) Int. Cl.
*G06F 3/033* (2006.01)
(52) U.S. Cl. ...................................................... 345/166
(58) Field of Classification Search .................. 345/163, 345/166
See application file for complete search history.

(56) References Cited

U.S. PATENT DOCUMENTS

| | | | |
|---|---|---|---|
| 5,644,139 A | 7/1997 | Allen et al. | |
| 6,078,312 A * | 6/2000 | Liebenow | 345/166 |
| 6,222,174 B1 | 4/2001 | Tullis et al. | |
| 6,281,882 B1 | 8/2001 | Gordon et al. | |
| 6,433,780 B1 | 8/2002 | Gordon et al. | |
| 6,462,330 B1 * | 10/2002 | Venkat et al. | 250/239 |
| 7,339,575 B2 | 3/2008 | Tai et al. | |
| 2002/0080121 A1 * | 6/2002 | Son | 345/166 |
| 2003/0193529 A1 | 10/2003 | Lee et al. | |
| 2004/0189593 A1 | 9/2004 | Koay | |
| 2005/0060668 A9 | 3/2005 | Lee et al. | |
| 2005/0078087 A1 * | 4/2005 | Gates et al. | 345/163 |
| 2005/0231479 A1 | 10/2005 | Xie et al. | |
| 2005/0264531 A1 * | 12/2005 | Tai et al. | 345/163 |
| 2006/0086712 A1 * | 4/2006 | Feldmeier | 219/250 |
| 2007/0296699 A1 | 12/2007 | Bohn et al. | |
| 2008/0061219 A1 | 3/2008 | Lee et al. | |
| 2008/0252602 A1 * | 10/2008 | Kakarala et al. | |

FOREIGN PATENT DOCUMENTS

DE 69808522 8/2003

* cited by examiner

*Primary Examiner* — Amr Awad
*Assistant Examiner* — Jarurat Suteerawongsa

(57) ABSTRACT

An optical navigation device, such an optical mouse, includes a housing, an illumination system, a tracking engine, and multiple height-specific imaging systems located within the housing. The height-specific imaging systems generate image information in response to reflected light from a navigation surface and each one the height-specific imaging systems is positioned to detect the largest portion of reflected light at a different separation distance between the housing and the navigation surface. An integrated circuit (IC) device for optical navigation includes an aperture plate having height-specific apertures and height-specific navigation sensor arrays aligned in one-to-one correspondence with the height-specific apertures and configured to generate image information in response to light that passes through the corresponding height-specific apertures. An optical element for use in an optical navigation system includes an illumination source lens and multiple height-specific focal lenses.

17 Claims, 7 Drawing Sheets

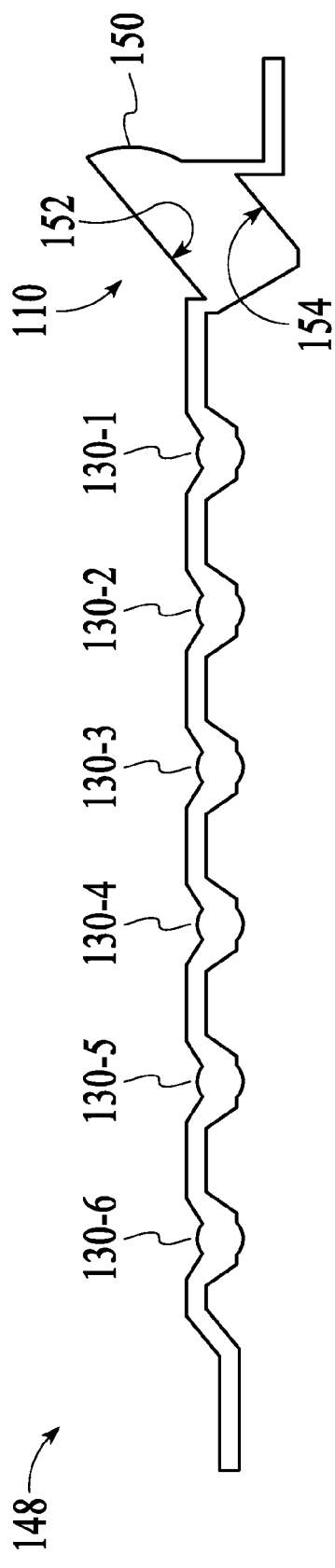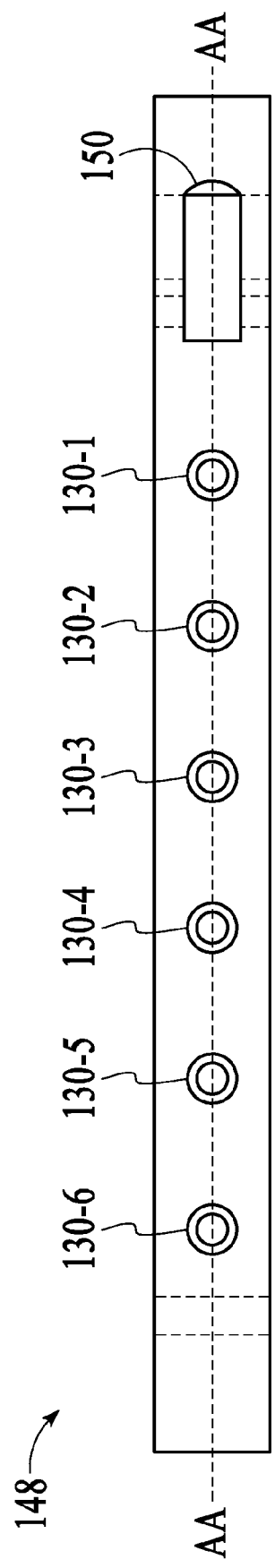

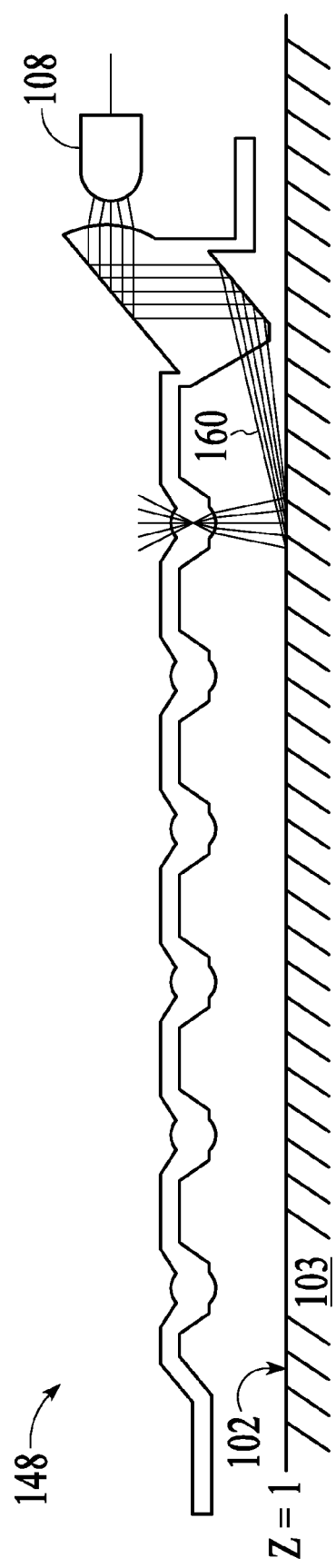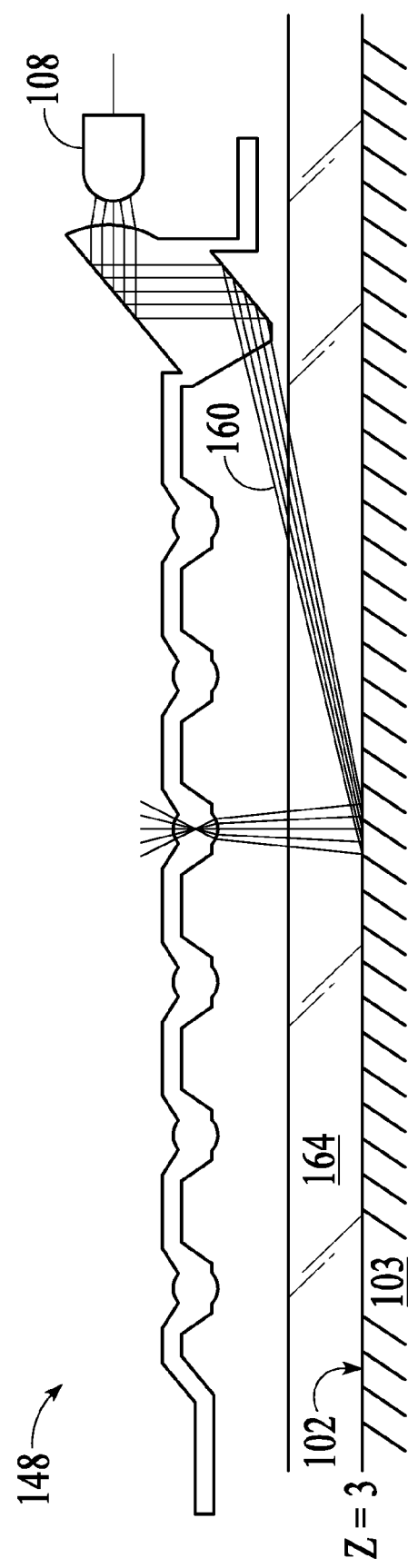

| Time | Z-height 1 | Z-height 2 | Z-height 3 | Z-height 4 | Z-height 5 | Z-height 6 |
|---|---|---|---|---|---|---|
| t1 | Squal low | Squal low | Squal low | Squal low | Squal low | Squal high |
| t2 | Squal low | Squal low | Squal low | Squal low | Squal high | Squal low |
| t3 | Squal low | Squal low | Squal low | Squal high | Squal low | Squal low |
| t4 | Squal low | Squal low | Squal high | Squal low | Squal low | Squal low |
| t5 | Squal high | Squal high | Squal low | Squal low | Squal low | Squal low |
| t6 | Squal low | Squal high | Squal low | Squal low | Squal low | Squal low |
| t7 | Squal low | Squal low | Squal high | Squal low | Squal low | Squal low |
| t8 | Squal low | Squal low | Squal low | Squal high | Squal low | Squal low |
| t9 | Squal low | Squal low | Squal low | Squal low | Squal high | Squal low |
| t10 | Squal low | Squal low | Squal low | Squal low | Squal low | Squal low |
| t11 | Squal low | Squal low | Squal low | Squal low | Squal low | Squal high |

OPTICAL NAVIGATION DEVICE ADAPTED FOR NAVIGATION ON A TRANSPARENT PLATE

BACKGROUND OF THE INVENTION

An optical navigation device, such as an optical mouse, typically includes a light source to illuminate a navigation surface and an optical navigation sensor integrated circuit (IC) that functions as a miniature digital camera to continually collect images of the illuminated navigation surface and to determine the speed and direction that the device is being moved across the surface by comparing sequentially recorded frames of image information. Image frames are collected at a very high rate and the resolution of the optical navigation sensor IC is high enough to detect very small movements of the device relative to the navigation surface.

When an optical mouse is used on most opaque surfaces, such as desktops, the collected image frames have enough features for the optical navigation sensor IC to determine relative movement between image frames. However, using an optical mouse on a transparent surface, such as a plate of glass that sits on a desktop, presents unique challenges. In particular, the top surface of the glass is usually too smooth to provide distinguishable features in the collected image frames and the thickness of the glass changes the geometry between the light source, the optical navigation sensor IC, and the underlying desktop such that an insufficient amount of light is reflected from the desktop to the optical navigation sensor IC.

An optical mouse could be designed for dedicated use on a desktop that is covered by a glass plate of known thickness. Although such an application-specific design is possible, it is not practical because an optical mouse may be used on both transparent and opaque surfaces over its lifetime and because the thickness of glass plates that cover desktops is difficult to predict and may change from plate to plate.

SUMMARY OF THE INVENTION

An optical navigation device, such an optical mouse, includes a housing, an illumination system, a tracking engine, and multiple height-specific imaging systems located within the housing. The height-specific imaging systems generate image information in response to reflected light from a navigation surface and each one the height-specific imaging systems is positioned to detect the largest portion of reflected light at a different separation distance between the housing and the navigation surface. That is, the optical navigation device includes multiple different imaging systems that are optimally positioned to collect image information at different distances from the navigation surface. This enables the optical navigation system to accurately track relative movement whether the optical mouse sits directly on a navigation surface such as a desktop or on a transparent surface such as a glass plate that lies between the optical mouse and the navigation surface. Further, the multiple different imaging systems enable the optical navigation system to automatically adapt to transparent plates having different thicknesses.

In an embodiment, an integrated circuit (IC) device for optical navigation includes an aperture plate having height-specific apertures and height-specific navigation sensor arrays aligned in one-to-one correspondence with the height-specific apertures and configured to generate image information in response to light that passes through the corresponding height-specific apertures. The IC device also includes a tracking engine configured to output relative movement information in response to the image information. In an embodiment, the tracking engine is configured to select image information from one of the height-specific navigation sensor arrays in response to a comparison of the image information from the plurality of height-specific sensor arrays and to use the selected image information to generate the relative movement information.

In an embodiment, an optical element for use in an optical navigation system that includes an illumination source and that is configured to detect relative movement between the optical navigation system and a navigation surface includes an illumination source lens configured to focus light, which is output from the illumination source, onto the navigation surface and multiple height-specific focal lenses configured to focus light that reflects off the navigation surface, wherein each height-specific focal lens is positioned to receive the largest portion of reflected light at a different separation distance between the optical navigation system and the navigation surface. In an embodiment, the illumination source and the plurality of height-specific focal lenses are linearly aligned.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 6A depicts a side view of an embodiment of an optical element that includes illumination system optics and six height-specific focal lenses.

FIG. 6B depicts a top view of the optical element from FIG. 6A.

FIG. 7A illustrates light paths between the optical element of FIGS. 6A and 6B and a navigation surface in the case where the separation distance is Z=1.

FIG. 7B illustrates light paths between the optical element of FIGS. 6A and 6B and the navigation surface in the case where the separation distance is Z=3.

FIG. 8 is a table of the relative surface quality (SQUAL) values in the case where an optical mouse dives from a separation distance of Z=6 to a separation distance of Z=1 and then lifts from a separation distance of Z=6 back to a separation distance of Z=1.

Throughout the description similar reference numbers may be used to identify similar elements.

DETAILED DESCRIPTION

Figure 1:
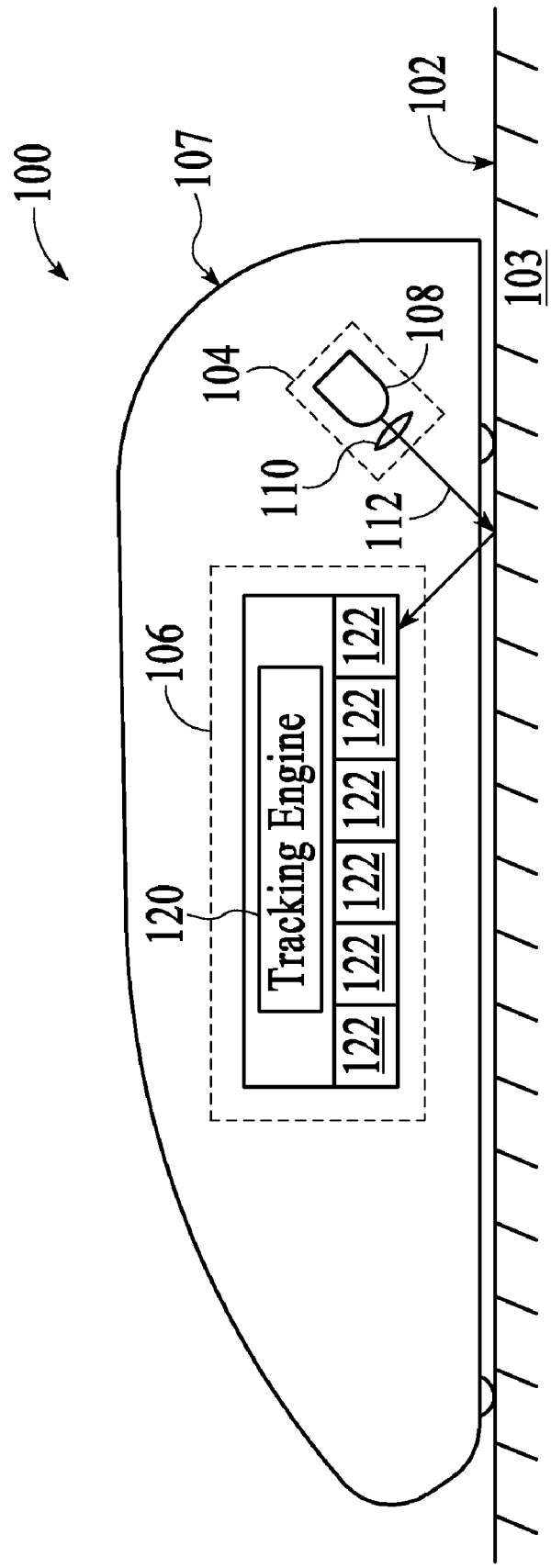
FIG. 1 is a cross-sectional view of an optical navigation device with an illumination system and a navigation sensor system that includes multiple height-specific imaging systems.

FIG. 1 is a cross-sectional view of an optical navigation device 100, referred to generally herein as an "optical mouse," which sits on and moves over a navigation surface 102 of a structure 103 such as a desktop. For purposes of this description, the optical mouse may be viewed as having two principal components, an illumination system 104 and a navigation sensor system 106, both of which are contained within a housing 107. The illumination system typically includes a light source 108 such as a light emitting diode (LED) or a vertical cavity surface emitting laser (VCSEL) and some optics 110 (including, for example, a lens), which together operate to illuminate a spot on the navigation surface with collimated light 112 that strikes the navigation surface at a shallow angle. Light from the illumination source reflects off the navigation surface and is detected by the navigation sensor system. In an embodiment, the navigation sensor system includes multiple height-specific imaging systems 122 and a tracking engine 120.

Figure 2:
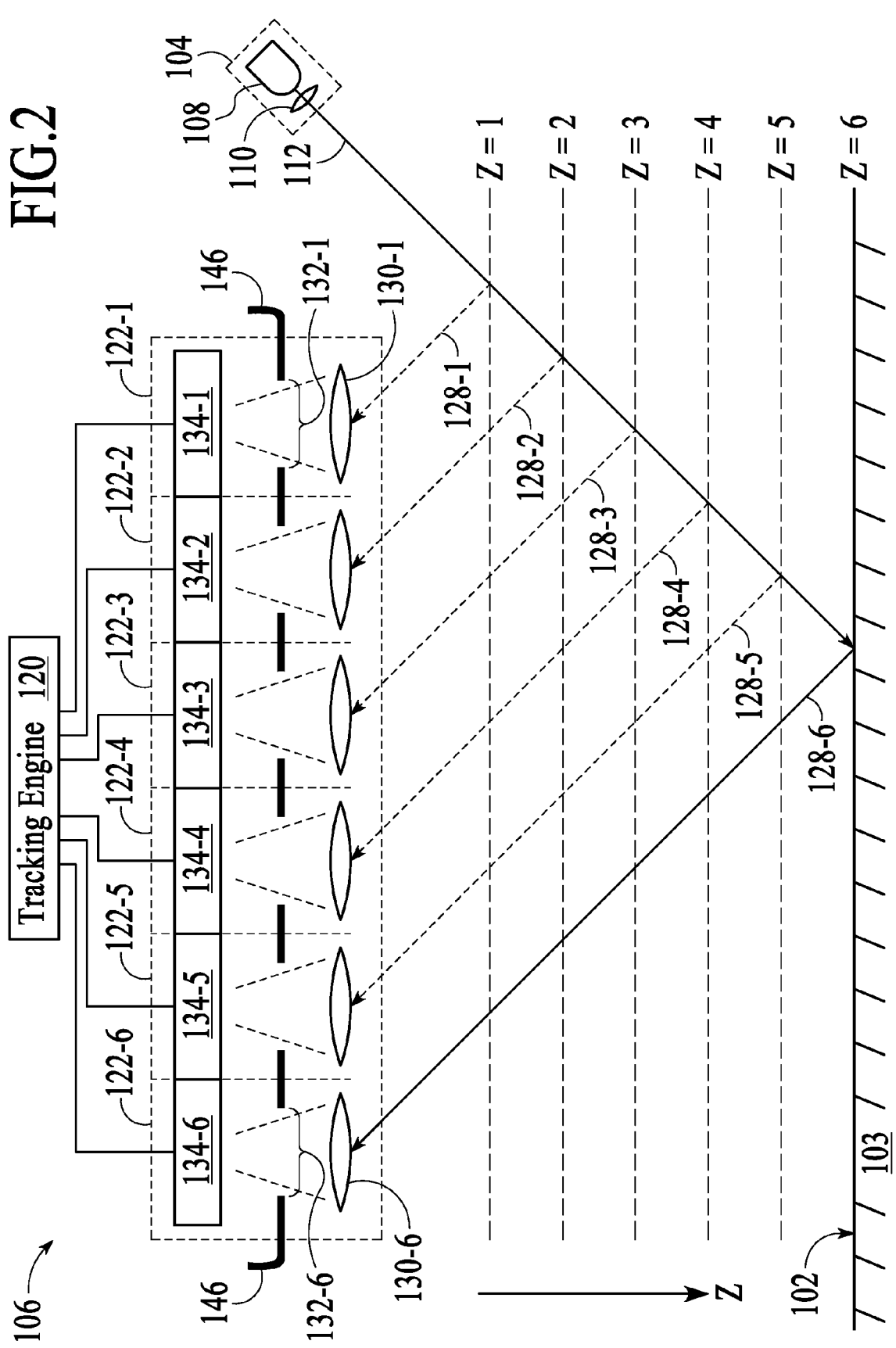
FIG. 2 depicts an expanded view of an embodiment of the navigation sensor system and the height-specific imaging systems from FIG. 1.

FIG. 2 depicts an expanded view of an embodiment of the illumination system 104 and the navigation sensor system 106 from FIG. 1. As is described in more detail below, FIG. 2 also illustrates the primary optical paths 128 of a reflected beam of light at six different separation distances between the navigation sensor system and the navigation surface. Referring to FIG. 2, each height-specific imaging system 122-1-122-6 includes a height-specific focal lens 130-1-130-6, a height-specific aperture 132-1-132-6 in an aperture plate 146, and a height-specific sensor array 134-1-134-6. The height-specific focal lenses are configured and positioned to focus light, which is reflected from the navigation surface 102, onto the corresponding height-specific sensor arrays. The height-specific apertures are configured and positioned to let the focused light pass to the height-specific sensor arrays while blocking other light that is not focused on the sensor array. The height-specific sensor arrays are configured and positioned to generate image information in response to the light that is received from the focal lenses.

Each height-specific sensor array 134-1-134-6 includes an array of distinct photodetectors (not shown), for example, a 16×16 or 32×32 array of distinct photodetectors configured to detect light that is reflected from the illuminated spot on the navigation surface. Each of the photodetectors in the array generates light intensity information that is output as a digital value (e.g., an 8-bit digital value). Image information is captured by the sensor arrays in sensor-specific frames, where a frame of image information includes a set of simultaneously captured values for each distinct photodetector in the respective sensor array. Image frames captured by the height-specific sensor arrays include data that represents features on the navigation surface 102. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

The tracking engine 120 compares successive image frames from the same height-specific sensor array to determine the movement of image features between frames. In particular, the tracking engine determines movement by correlating common features that exist in successive image frames from the same sensor array. The movement between image frames is expressed in terms of movement vectors in, for example, X and Y directions (e.g., $\Delta X$ and $\Delta Y$). The movement vectors are then used to determine the movement of the optical mouse relative to the navigation surface. More detailed descriptions of exemplary navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

As described above, an optical mouse may be used on a transparent structure such as a glass plate that sits on top of an opaque structure such as a desktop. The optical navigation device 100 depicted in FIGS. 1 and 2 is configured to enable navigation tracking whether the optical navigation system is used directly on the navigation surface 102 (e.g., a desktop) or on a transparent structure (e.g., a glass plate) that sits between the optical mouse and the navigation surface. For purposes of this description, the term "navigation surface" refers to the surface that has imagable features that are captured in the image frames. For example, in the case of a transparent plate that sits on a desktop, the top surface of the desktop is considered the navigation surface because this is the only surface that includes imagable features, assuming that the transparent structure has a smooth surface that includes no imagable features.

As depicted in FIG. 2, the separation distance between the navigation sensor system 106 and the navigation surface 102 is defined as "Z." The height-specific imaging systems 122-1-122-6 are positioned to collect image information at different separation distances, Z. In particular, the six height-specific imaging systems are positioned to collect image information at six different distances, Z=1 through Z=6. Referring to FIG. 2, height-specific imaging system 122-1 is positioned to collect image information at separation distance Z=1, height-specific imaging system 122-2 is positioned to collect image information at separation distance Z=2, height-specific imaging system 122-3 is positioned to collect image information at separation distance Z=3, and so on.

The light 112 that illuminates the navigation surface 122 is typically scattered in random directions by the navigation surface and all of the height-specific imaging systems 122-1-122-6 tend to collect image information of varying degrees of quality. Although light is scattered in random directions, a major portion of the collimated light is reflected from the navigation surface at the angle incidence. Given that a major portion of the light is reflected at the angle of incidence, the height-specific imaging systems can be positioned such that each one of the imaging systems detects the largest portion of the reflected light at a different separation distance. Referring again to FIG. 2, height-specific imaging system 122-1 is positioned to detect the largest portion of reflected light at separation distance Z=1, height-specific imaging system 122-2 is positioned to detect the largest portion of reflected light at separation distance Z=2, height-specific imaging system 122-3 is positioned to detect the largest portion of reflected light at separation distance Z=3, and so on.

Because light is scattered amongst the height-specific imaging systems 122-1-122-6, the image information generated from the height-specific imaging systems has varying degrees of quality. In general, the more light that is detected by a height-specific imaging system, the more distinguishable features that appear in the corresponding image frames. The more distinguishable features that appear in the image frames, the better the correlation results.

Because all of the height-specific imaging systems 122-1-122-6 tend to generate image information, the tracking engine 120 is configured to select image information from one of the height-specific imaging systems to use for navigation tracking. In an embodiment, the tracking engine compares the image information from the different height-specific imaging systems and selects the image information from the height-specific imaging system that is generating the highest quality image information. For example, the height-specific imaging system that generates image frames with the most distinguishable features. In an embodiment, the quality of the image information is identified based on a comparison of surface quality (SQUAL) values, where a SQUAL value is a measure of the number of valid features on a navigation surface that are visible by a sensor array in the current image frame. Although SQUAL is provided as one example, other techniques for comparing the quality of the image information from the different height-specific imaging systems can be used to select the optimal image information for use in navigation tracking.

In operation, the tracking engine 120 generates a different SQUAL value for each height-specific imaging system 122-1-122-6 using image information from each height-specific imaging system. The tracking engine then compares the SQUAL values and selects the source of the highest SQUAL value as the source of the image information that is used for navigation tracking. In an embodiment, the tracking engine periodically evaluates the SQUAL values of all of the height-specific imaging systems to determine if the optimal image information is still being used to generate the relative movement information. If the image information corresponding to the highest SQUAL value is not being used to generate the relative movement information, then an appropriate change can be made. The relative differences between SQUAL values should stay fairly constant during normal use such that the source that corresponds to the actual separation distance (Z distance) maintains the highest SQUAL value relative to the other SQUAL values.

In an embodiment, if the SQUAL values of two adjacent height-specific imaging systems 122-1-122-6 are the same, or nearly the same, (e.g., when the separation distance Z is between two height-specific imaging systems), either one of the height-specific imaging systems can be selected.

Given the position of the height-specific imaging systems 122-1-122-6 and the process for selecting the image information for use in navigation tracking, the optical mouse is able to adapt to different separation distances between the optical mouse and the navigation surface. For example, if the optical mouse is used directly on a navigation surface, such that the separation distance is $Z=1$, then image information from the height-specific imaging system 122-1 is used by the tracking engine to generate relative movement information. If on the other hand the optical mouse is used on a transparent plate that sits between the optical mouse and the navigation surface, then image information from one of the other height-specific imaging systems is used by the tracking engine to generate relative movement information. The source of the selected image information is a function of the separation distance between the optical mouse and the navigation surface. When the optical mouse is used on a transparent plate, the selected image information is a function of the thickness of the transparent plate between the optical mouse and the navigation surface. For example, if the thickness of the transparent plate sets the separation distance at $Z=3$, then the image information from height-specific imaging system 122-3 is used to generate relative movement information. Likewise, if the thickness of the transparent plate sets the separation distance at $Z=5$, then the image information from the height-specific imaging system 122-5 is used to generate relative movement information. The same is true for the other identified separation distances. Further, if the separation distance changes during use, the change in SQUAL value will be recognized and image information from a more appropriate (e.g., higher SQUAL value) height-specific imaging system will be selected.

The total depth of field of the navigation sensor system is a function of the number and positioning of the height-specific imaging systems 122-1-122-6. Although six height-specific imaging systems are described in the examples, other numbers of height-specific imaging systems are possible. Even a navigation sensor system with two height-specific imaging systems would provide the ability to adapt to use on both a navigation surface and a transparent plate over a transparent surface. In an embodiment, smooth transitions between height-specific imaging systems are achieved by positioning the height-specific imaging systems directly adjacent to each other. For example, the height-specific imaging systems are configured such that the respective height-specific sensor arrays are side-by-side.

In an embodiment, each height-specific imaging system enable navigation tracking within a range of separation distances. For example, each height-specific imaging system enables adequate navigation tracking at a separation distance of ±0.2 mm of the separation distance Z. The distance of adequate navigation tracking is referred to as the "depth of field." In an embodiment, the adjacent height-specific imaging systems are positioned such that the depth of field is slightly overlapping for each pair of adjacent imaging systems. The slight overlapping of the depth of field of adjacent height-specific imaging systems results in a continuous depth of field that includes the ranges of all of the height-specific imaging systems. For example, the combined and continuous depth of field in the example of FIG. 2 would range from $Z=1-0.2$ mm to $Z=6+0.2$ mm.

Figure 3A:
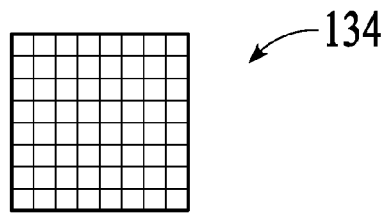
FIG. 3A depicts a top view of a sensor array that is used in the navigation sensor system described with reference to FIGS. 1 and 2.
Figure 3B:
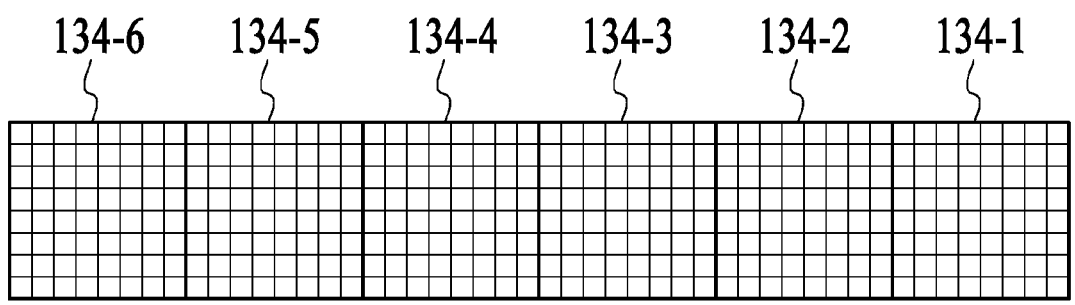
FIG. 3B depicts an embodiment of a sensor array that includes multiple height-specific sub-arrays aligned side-by-side.

FIG. 3A depicts a top view of a sensor array 134 that is used in the navigation sensor system 106 described with reference to FIGS. 1 and 2. For example purposes, the sensor array is an 8×8 sensor array although sensor arrays with different numbers of photodetectors are possible. In an embodiment, multiple height-specific sensor arrays are configured side-by-side to form the navigation sensor system described above with reference to FIG. 2. FIG. 3B depicts an embodiment of a sensor array that includes multiple height-specific sensor arrays 134-1-134-6 aligned side-by-side. Each height-specific sensor array, also referred to as a sub-array, produces a distinct image frame. The distinct image frames from one of the height-specific sensor arrays are used, as described above, to generate relative movement information.

Figure 4:
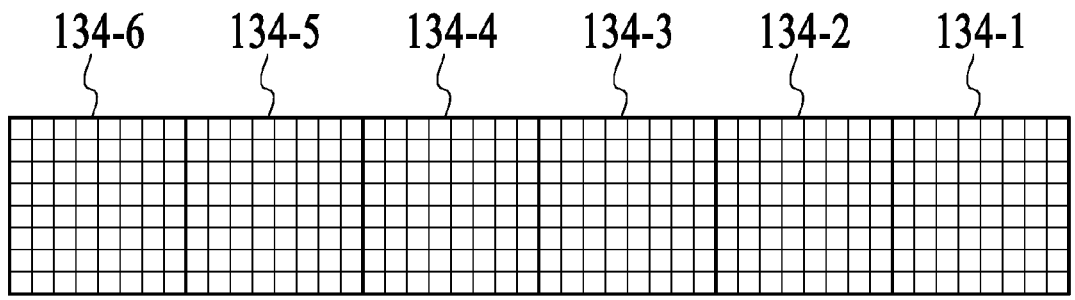
FIG. 4 depicts an embodiment of a navigation sensor integrated circuit (IC) that includes height-specific sub-arrays and a tracking engine fabricated on the same substrate.
Figure 5:
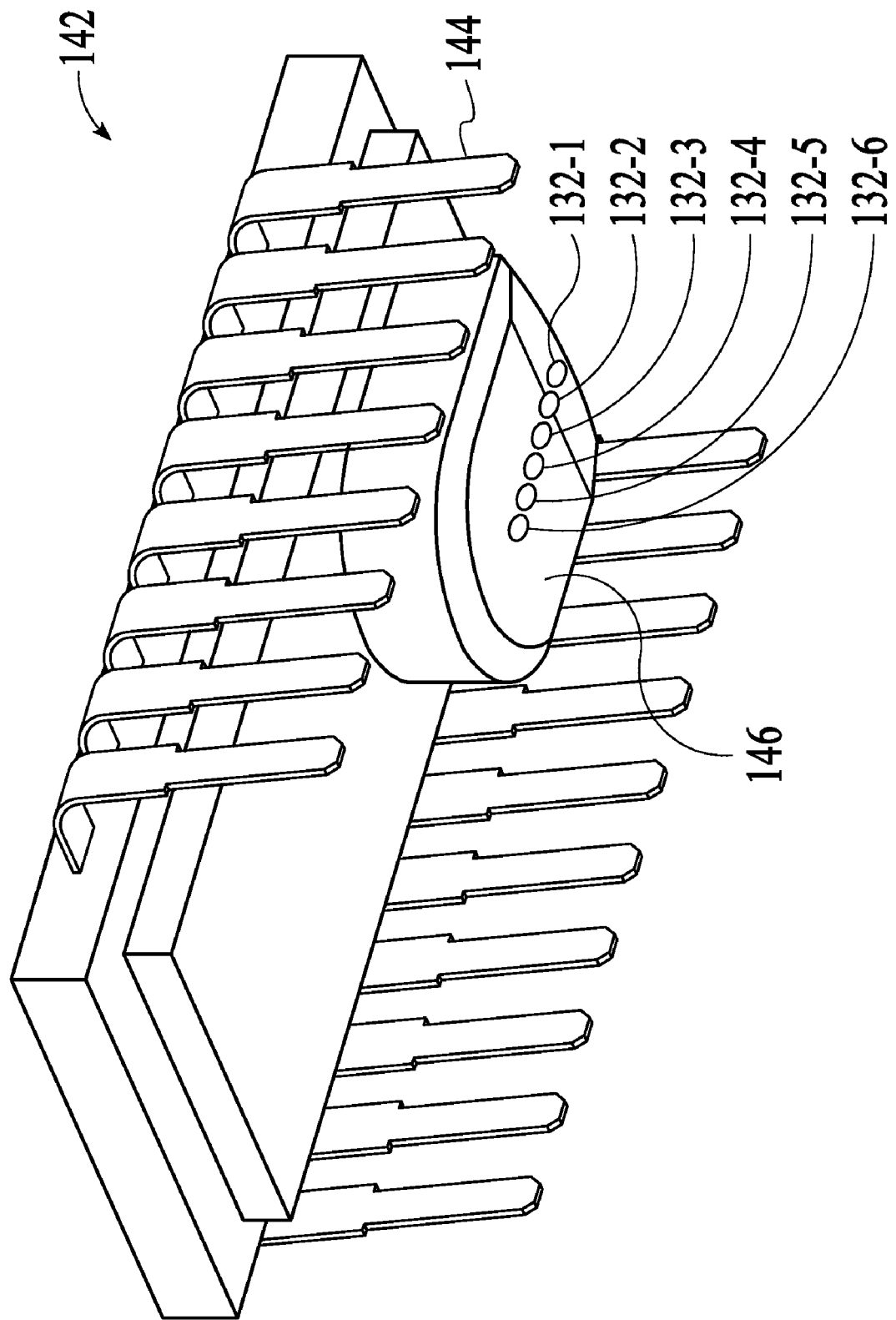
FIG. 5 depicts an embodiment of a navigation sensor IC device within which the navigation sensor IC from FIG. 4 is packaged.

In an embodiment, the height-specific sensor arrays 134-1-134-6 and the tracking engine are fabricated on the same substrate. FIG. 4 depicts an embodiment of a navigation sensor integrated circuit (IC) 140 that includes the height-specific sensor arrays 134-1-134-6 and the tracking engine fabricated on the same substrate. In an embodiment, the navigation sensor IC is assembled into a package such as a dual in-line package (DIP) to produce a navigation sensor IC device that can be used as a component of an optical mouse. FIG. 5 depicts an embodiment of a navigation sensor IC device 142 within which the navigation sensor IC (not shown) from FIG. 4 is packaged. The navigation sensor IC device includes electrical leads 144 and an aperture plate 146. The aperture plate includes height-specific apertures 132-1-132-6 that are positioned to correspond to the height-specific sensor arrays 134-1-134-6 as described with reference to FIGS. 2 and 4. In the embodiment of FIG. 5, the navigation sensor IC device is positioned within an optical mouse such that light reflected from the navigation surface passes through the height-specific apertures and is detected by the height-specific sensor arrays. As described above, the height-specific sensor array that receives the largest portion of reflected light is a function of the separation distance between the optical mouse and the navigation surface.

In an embodiment, the height-specific focal lenses 130-1-130-6 and the illumination system optics 110 are integrated into a single optical element. FIG. 6A depicts a side view of an embodiment of an optical element 148 that includes illumination system optics 110 and six height-specific focal lenses 130-1-130-6. The illumination system optics include a collimating lens 150 and two total internal reflection (TIR) surfaces 152, 154. FIG. 6B depicts a top view of the optical element from FIG. 6A. As depicted in FIG. 6B, the height-specific focal lenses and the illumination system optics are linearly aligned with each other along axis AA. Although the height-specific focal lenses and the illumination system are linearly aligned in the example of FIGS. 6A and 6B, this is not a requirement. For example, the height-specific focal lenses can be positioned in a non-linear manner as long as each corresponding height-specific imaging system is configured to provide optimal image information as a different separation distance. In an embodiment, the optical element is a monolithic optical element made of optical grade plastic that can be produced by molding. In an embodiment, the height-specific lenses are positioned to correspond to the height-specific sensor arrays of the navigation sensor IC device depicted in FIG. 5. Note that the elements depicted in FIGS. 5, 6A, and 6B are not to scale individually or relative to each other.

As described above, the purpose of the optical element is to collimate and guide light from a light source to illuminate a spot on the navigation surface and to focus reflected light onto the height-specific sensor arrays. FIGS. 7A and 7B depict light paths 160 for two different separation distances between the optical element 148 and the navigation surface 102. FIG. 7A illustrates the case where the optical mouse sits directly on a navigation surface such as a desktop. In this case, the separation distance is Z=1. At a separation distance of Z=1, light from the light source is collimated by the collimating lens 150 and then reflected by the two TIR surfaces 152, 154 onto the navigation surface. At Z=1, the largest portion of the reflected light is received by the height-specific focal lens 130-1. The height-specific focal lens 130-1 focuses the light to the respective height-specific sensor array (not shown).

FIG. 7B illustrates the case where the optical mouse sits on a transparent plate 164 that is between the optical mouse and the navigation surface 102. In this case, the separation distance is Z=3. At a separation distance of Z=3, light from the light source is collimated by the collimating lens 150 and then reflected by the two TIR surfaces 152, 154 onto the navigation surface. At Z=3, the largest portion of the reflected light is received by the height-specific focal lens 130-3. The height-specific focal lens 130-3 focuses the light to the respective height-specific sensor array (not shown). Similar paths are followed for the other separation distances.

Some users may rapidly change the separation distance between the optical mouse and the navigation surface with lifting and/or diving actions. Lifting and/or diving actions result in changes to the quality of the image information generated at each height-specific imaging system. For example, the highest SQUAL value will move between the different height-specific imaging systems as the optical mouse moves between the different separation distances (e.g., from Z=6 to Z=1). FIG. 8 is a table of the relative SQUAL values in the case where the optical mouse dives from a separation distance of Z=6 to a separation distance of Z=1 and then lifts from a separation distance of Z=6 back to a separation distance of Z=1. As shown in the table, the highest SQUAL value trends from Z=6 to Z=1 and then back to Z=6. In an embodiment, the tracking engine is configured to recognize the changes in the separation distance and to take appropriate action in response to the changes. In an embodiment, the action taken by the tracking engine involves indicating that motion in the X-Y plane should not be reported. That is, in some applications, the user of the mouse does not intend for navigation tracking to take place while the mouse is moved in lifting and diving motions above the navigation surface. Therefore, once the tracking engine recognizes a lifting or diving motion from the change in SQUAL values, the reporting of relative motion information in the X-Y plane is suspended until the lifting or diving ceases.

An advantage of utilizing height-specific imaging systems to adapt an optical mouse to different separation distances is that this technique requires no moving parts and no adjustments to the geometry of the optical mouse, including the navigation sensor system 106 and the illumination system 102. That is, an optical mouse that utilizes height-specific imaging systems as described above requires no physical changes to be made by a user to adapt the optical mouse for use on a glass surface or for use on glass surfaces of different thicknesses.

Although specific embodiments of the invention have been described and illustrated, the invention is not to be limited to the specific forms or arrangements of parts as described and illustrated herein. The invention is limited only by the claims.

What is claimed is:

1. An optical navigation device comprising:
   a housing;
   an illumination system located within the housing and configured to illuminate a navigation surface;
   a plurality of height-specific imaging systems located within the housing, wherein the height-specific imaging systems are configured to generate image information in response to reflected light from the illumination of the navigation surface and wherein each one of the height-specific imaging systems is positioned to detect the largest portion of the reflected light at a different separation distance between the housing and the navigation surface; and
   a tracking engine configured to generate relative movement information, related to movement between the housing and the navigation surface, in response to the image information;
   wherein the tracking engine is configured to select image information from one of the height-specific imaging systems in response to a comparison of the image information from the plurality of height-specific imaging systems and to use the selected image information to generate the relative movement information;
   wherein the plurality of height-specific imaging systems comprises:
   a first height-specific focal lens configured to focus light that reflects off the navigation surface, wherein the first height-specific focal lens is positioned to receive the largest portion of reflected light at a first separation distance between the optical navigation device and the navigation surface, wherein the first separation distance is the distance when the optical navigation device sits directly on the navigation surface; and
   a plurality of additional height-specific focal lenses configured to focus light that reflects off the navigation surface, wherein the plurality of additional height-specific focal lenses are positioned to receive the largest portion of reflected light at a plurality of different separation distances between the optical navigation device and the navigation surface, wherein the plurality of different separation distances are greater than the first separation distance and different from each other.

2. The optical navigation device of claim 1 wherein each height-specific imaging system comprises configured to generate image information related to the illuminated navigation surface.

3. The optical navigation device of claim 2 further comprising an aperture plate having height-specific apertures that correspond to the height-specific focal lenses and the height-specific sensor arrays.

4. The optical navigation device of claim 2 wherein each height-specific imaging system comprises a height-specific aperture.

5. The optical navigation device of claim 2 wherein the height-specific lenses are integrated into a single optical element.

6. The optical navigation device of claim 2 wherein each height-specific sensor array outputs a SQUAL value that is representative of light that is detected by the respective height-specific navigation sensor array.

7. The optical navigation device of claim 6 wherein the tracking engine is configured to select image information from one of the height-specific imaging systems in response to the SQUAL values and to use the selected image information to generate the relative movement information.

8. The optical navigation device of claim 1 wherein the navigation surface is located below a transparent plate.

9. An optical navigation device comprising:
an illumination system configured to illuminate a navigation surface;
a first height-specific focal lens configured to focus light that reflects off the navigation surface, wherein the first height-specific focal lens is positioned to receive the largest portion of reflected light at a first separation distance between the optical navigation device and the navigation surface, wherein the first separation distance is the distance when the optical navigation device sits directly on the navigation surface; and
a plurality of additional height-specific focal lenses configured to focus light that reflects off the navigation surface, wherein the plurality of additional height-specific focal lenses are positioned to receive the largest portion of reflected light at a plurality of different separation distances between the optical navigation device and the navigation surface, wherein the plurality of different separation distances are greater than the first separation distance and different from each other;
a sensor array comprising multiple sub-arrays, wherein each sub-array is configured to generate image information related to the illuminated navigation surface; and
a tracking engine configured to select image information from one of the sub-arrays and to generate relative movement information, related to movement between the navigation sensor array and the navigation surface, in response to the selected image information;
wherein the tracking engine is configured to select image information from one of the sub-arrays in response to a comparison of the image information generated from the sub-arrays.

10. The optical navigation device of claim 9 further comprising height-specific focal lenses positioned to correspond to the sub-arrays.

11. The optical navigation device of claim 10 wherein the height-specific lenses are integrated into a single optical element.

12. The optical navigation device of claim 9 further comprising an aperture plate having height-specific apertures that correspond to the sub-arrays.

13. The optical navigation device of claim 9 wherein each sub-array outputs a SQUAL value that is representative of light that is detected by the respective height-specific sensor arrays.

14. The optical navigation device of claim 13 wherein the tracking engine is configured to select image information from one of the height-specific imaging systems in response to the SQUAL values and to use the selected image information to generate the relative movement information.

15. An optical element for use in an optical navigation system that includes an illumination source and that is configured to detect relative movement between the optical navigation system and a navigation surface, the optical element comprising:
an illumination source lens configured to focus light, which is output from the illumination source, onto the navigation surface;
a first height-specific focal lens configured to focus light that reflects off the navigation surface, wherein the first height-specific focal lens is positioned to receive the largest portion of reflected light at a first separation distance between the optical navigation system and the navigation surface, wherein the first separation distance is the distance when the optical navigation system sits directly on the navigation surface; and
a plurality of additional height-specific focal lenses configured to focus light that reflects off the navigation surface, wherein the plurality of additional height-specific focal lenses are positioned to receive the largest portion of reflected light at a plurality of different separation distances between the optical navigation system and the navigation surface, wherein the plurality of different separation distances are greater than the first separation distance and different from each other.

16. The optical element of claim 15 wherein the first and plurality of additional height-specific lenses are linearly aligned.

17. The optical element of claim 15 wherein the illumination source lens and the first and plurality of additional height-specific lenses are linearly aligned.

* * * * *